United States Patent
Cangioli

(10) Patent No.: US 6,796,221 B1
(45) Date of Patent: Sep. 28, 2004

(54) COOKWARE WITH PROPPING ASSEMBLY

(76) Inventor: Harold Cangioli, 650 Bucks Church Rd., Newport, PA (US) 17074

( * ) Notice: Subject to any disclaimer, the term of this patent is extended or adjusted under 35 U.S.C. 154(b) by 163 days.

(21) Appl. No.: 10/389,203

(22) Filed: Mar. 14, 2003

(51) Int. Cl.⁷ .......................... A47J 37/00; A47J 37/10; A47G 23/02; F24C 15/10; A23L 1/00
(52) U.S. Cl. ............................. 99/425; 99/400; 99/422; 99/446; 126/215; 126/373.1
(58) Field of Search .......................... 99/339, 340, 400, 99/401, 444–450, 422–425; 126/373.1, 215, 98, 390.1; 248/688, 152; 254/104; 220/912, 373.1

(56) References Cited

U.S. PATENT DOCUMENTS

| | | | | |
|---|---|---|---|---|
| 1,505,675 A | * | 8/1924 | Stirn | 99/339 |
| 1,612,521 A | * | 12/1926 | McNaughton | 99/425 X |
| 2,871,848 A | * | 2/1959 | Wall et al. | 126/215 |
| 2,903,229 A | * | 9/1959 | Lange | 248/688 |
| 3,086,448 A | * | 4/1963 | Forman | 126/373.1 |
| 3,215,063 A | * | 11/1965 | Olson et al. | 99/425 |
| 4,352,324 A | * | 10/1982 | Noh | 99/425 |
| 5,848,584 A | * | 12/1998 | Brog | 126/30 |
| 5,850,779 A | * | 12/1998 | Zimmerman | 99/425 |

* cited by examiner

*Primary Examiner*—Timothy F. Simone

(57) ABSTRACT

A cookware with propping assembly for aiding in draining grease from foods while cooking. The cookware with propping assembly includes a piece of cookware and a propping assembly. The piece of cookware includes a heating portion and a handle portion with a proximal end and a distal end. The proximal end of the handle is operationally coupled to the heating portion. The handle extends outwardly from the heating portion. The propping assembly is coupled to the handle portion adjacent to the distal end. The propping assembly has a length greater than a distance between a bottom of the handle and a support surface whereby the handle is supported above the support surface and the heating portion is tilted from a horizontal resting position. The propping assembly further comprises a pair of propping legs. Each one of the propping legs is pivotally coupled to the handle member.

11 Claims, 3 Drawing Sheets

COOKWARE WITH PROPPING ASSEMBLY

BACKGROUND OF THE INVENTION

1. Field of the Invention

The present invention relates to cooking utensils and more particularly pertains to a new cookware with propping assembly for aiding in draining grease from foods while cooking.

2. Description of the Prior Art

The use of cooking utensils is known in the prior art. U.S. Pat. No. 2,903,229 describes a device, which supports the base of a pan to tilt the pan. Another type of cooking utensils is U.S. Pat. No. 2,871,848 disclosing a wedge, which is positionable under cookware.

While these devices fulfill their respective, particular objectives and requirements, the need remains for a device/ that has an integrated support away from a burner.

SUMMARY OF THE INVENTION

The present invention meets the needs presented above by providing a pair of propping legs which are pivotally coupled to the handle portion of the cookware and may be positioned in at least two extended positions and may be infinitely adjustable.

An object of the present invention is to provide a new cookware with propping assembly that provides multiple positions or degrees of tilt for draining grease away from food.

Another object of the present invention is to provide a new cookware with propping assembly that includes a support means for resting cooking utensils of the handle of the cookware.

To this end, the present invention generally comprises a piece of cookware and a propping assembly. The piece of cookware includes a heating portion and a handle portion with a proximal end and a distal end. The proximal end of the handle is operationally coupled to the heating portion. The handle extends outwardly from the heating portion. The propping assembly is coupled to the handle portion adjacent to the distal end. The propping assembly has a length greater than a distance between a bottom of the handle and a support surface whereby the handle is supported above the support surface and the heating portion is tilted from a horizontal resting position. The propping assembly further comprises a pair of propping legs. Each one of the propping legs is pivotally coupled to the handle member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
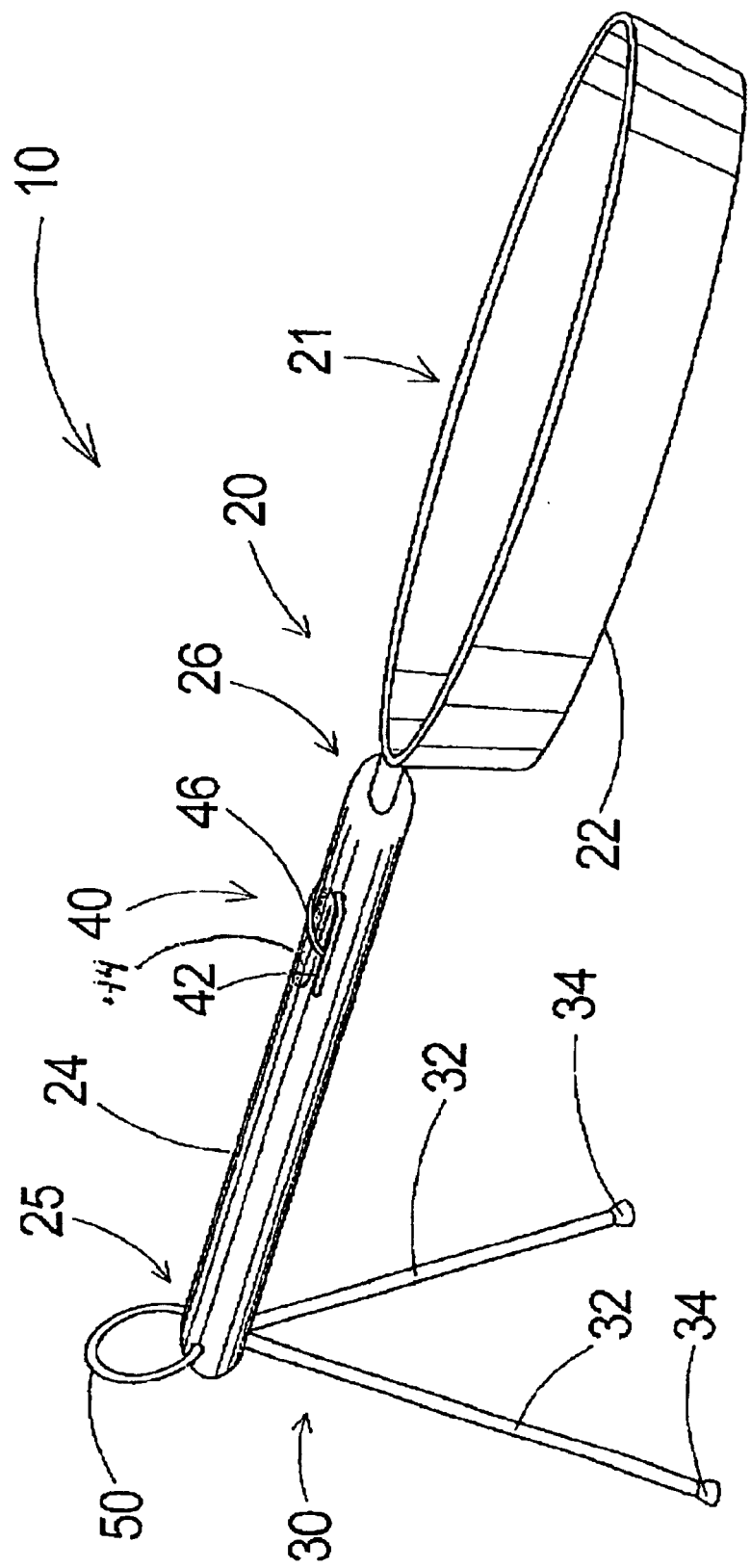
FIG. 1 is a schematic perspective view of a new cookware with propping assembly according to the present invention.
Figure 2:
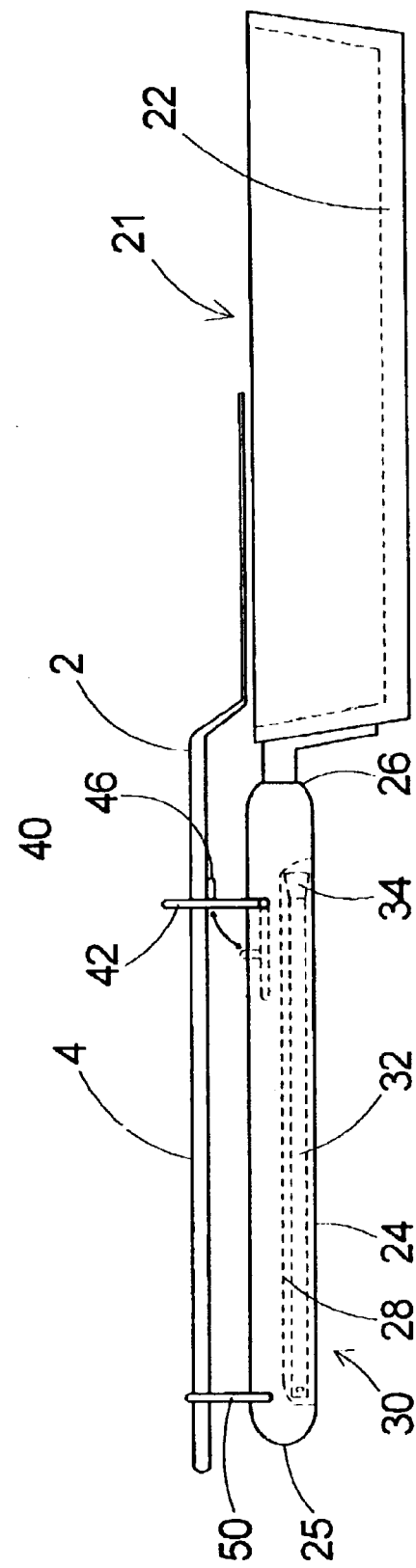
FIG. 2 is a schematic side view of the present invention.
Figure 3:
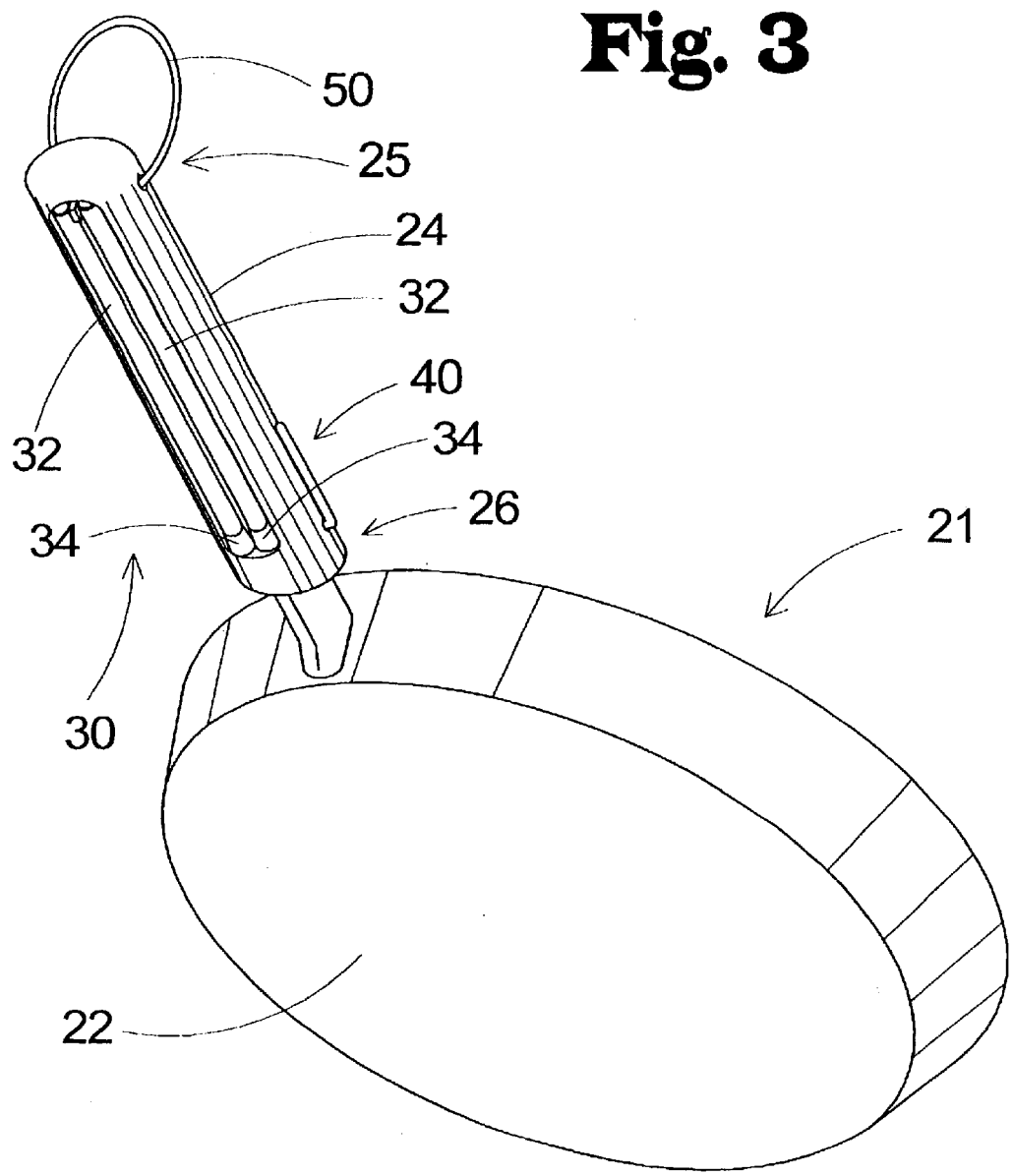
FIG. 3 is a schematic perspective bottom view of the present invention.

With reference now to the drawings, and in particular to FIGS. 1 through 3 thereof, a new cookware with propping assembly embodying the principles and concepts of the present invention and generally designated by the reference numeral 10 will be described.

As best illustrated in FIGS. 1 through 3, the cookware with propping assembly 10 generally comprises a piece of cookware 20 and a propping assembly 30.

The piece of cookware 20 includes a heating portion 21 and a handle portion 24. The heating portion 21 includes a bottom wall 22 designed for resting upon a burner and for supporting food to be heated. The handle portion 24 includes a proximal end 25 and a distal end 26. The proximal end 25 of the handle portion 24 is operationally coupled to the heating portion 21. The handle portion 24 extends outwardly from the heating portion 21. Illustrative examples of the cookware 20 include but certainly are not limited to: pots, pans, skillets, and grills.

Preferably, the propping assembly 30 is coupled to the handle portion 24 adjacent to the distal end 26. The propping assembly 30 has a length greater than a distance between a bottom of the handle portion 24 and a support surface when the cookware 20 is in a horizontal resting position. The propping assembly 30 also has an extended position. Thus, the handle portion 24 is supported above the support surface and the heating portion 21 is tilted from a horizontal resting position.

The propping assembly 30 further comprises a pair of propping legs 32. Each one of the propping legs 32 is pivotally coupled to the handle portion 24. Each one of the propping legs 32 has a stored position parallel to the handle portion 24. Each one of the propping legs 32 also has an extended position in which the propping leg 32 has an oblique angular relationship to the handle portion 24.

In an embodiment each of the pair of propping legs 32 also has a third position where the propping leg 32 is at a right angle to the handle portion 24.

In an embodiment, the handle portion 24 includes a depression 28 positioned along a bottom surface of the handle portion 24. The depression 28 is for receiving the pair of propping legs 32 when the pair of propping legs 32 is in a stored position.

In still a further embodiment, each one of the pair of propping legs 32 has a pad member 34 coupled to the propping leg 32 opposite of the handle portion 24. The pad member 34 is for inhibiting slippage of the propping leg 32 relative to a support surface.

In yet a further embodiment, a utensil support assembly 40 is pivotally coupled to the handle portion 24 adjacent to the heating portion 21. The utensil support assembly 40 is for supporting a handle portion 4 of a cooking utensil 2 used in conjunction with the cookware 20.

In even still a further embodiment the utensil support assembly 40 further comprises a first upright member 42 pivotally coupled to a first side of the handle portion 24, a second upright member 44 pivotally coupled to a second side of the handle portion 24, and a cross member 46 extending from a medial portion of the first upright member 42 to a medial portion of the second upright member 44. The cross member 46 supports the handle portion 4 of the cooking utensil 2 when the cooking utensil 2 is positioned along the handle portion 24.

In yet a further embodiment, a ring member 50 is pivotally coupled to the handle portion 24 adjacent to the distal end 26 of the handle portion 24. The ring member 50 encircles a distal end of the handle 4 of the cooking utensil 2 positioned on the utensil support member 40 to prevent unwanted slippage of the cooking utensil 2 from the utensil support member 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cookware with propping assembly for draining grease away from food while cooking, comprising:
    a piece of cookware having a heating portion and a handle portion, said heating portion having a bottom wall adapted for resting upon a burner and for supporting food to be heated, said handle portion having a proximal end and a distal end, said proximal end of said handle portion being operationally coupled to said heating portion, said handle portion extending outwardly from said heating portion;
    a propping assembly coupled to said handle portion adjacent to said distal end, said propping assembly having a length greater than a distance between a bottom of said handle portion and a support surface, said propping assembly having an extended position whereby said handle portion is supported above the support surface and said heating portion is tilted from a horizontal resting position;
    said propping assembly further comprises a pair of propping legs, each one of said propping legs being pivotally coupled to said handle portion, each one of said propping legs having a stored position defined by a longitudinal axis of said propping leg being in a substantially parallel relationship with a longitudinal axis of said handle portion, each one of said propping legs having an extended position defined by said longitudinal axis of said propping leg being in an oblique angular relationship to said longitudinal axis of said handle portion.

2. The cookware with propping assembly of claim 1, wherein each of said pair of propping legs having a third position defined by said longitudinal axis of said propping leg being in a right angular relationship with said longitudinal axis of said handle portion.

3. The cookware with propping assembly of claim 1, wherein said handle portion having a depression positioned along a bottom surface of said handle portion, said depression being for receiving said pair of propping legs when said pair of propping legs is in a stored position.

4. The cookware with propping assembly of claim 1, wherein each one of said pair of propping legs further comprises a pad member coupled to said propping leg opposite of said handle portion, said pad member being for inhibiting slippage of said propping leg relative to a support surface.

5. A cookware with propping assembly for draining grease away from food while cooking, comprising:
    a piece of cookware having a heating portion and a handle portion, said heating portion having a bottom wall adapted for resting upon a burner and for supporting food to be heated, said handle portion having a proximal end and a distal end, said proximal end of said handle portion being operationally coupled to said heating portion, said handle portion extending outwardly from said heating portion;
    a propping assembly coupled to said handle portion adjacent to said distal end, said propping assembly having a length greater than a distance between a bottom of said handle portion and a support surface, said propping assembly having an extended position whereby said handle portion is supported above the support surface and said heating portion is tilted from a horizontal resting position;
    said propping assembly further comprises a pair of propping legs, each one of said propping legs being pivotally coupled to said handle portion, each one of said propping legs having a stored position defined by a longitudinal axis of said propping leg being in a substantially parallel relationship with a longitudinal axis of said handle portion, each one of said propping legs having an extended position defined by said longitudinal axis of said propping leg being in an oblique angular relationship to said longitudinal axis of said handle portion;
    wherein each of said pair of propping legs having a third position defined by said longitudinal axis of said propping leg being in a right angular relationship with said longitudinal axis of said handle portion;
    wherein said handle portion having a depression positioned along a bottom surface of said handle portion, said depression being for receiving said pair of propping legs when said pair of propping legs is in a stored position; and
    wherein each one of said pair of propping legs further comprises a pad member coupled to said propping leg opposite of said handle portion, said pad member being for inhibiting slippage of said propping leg relative to a support surface.

6. The cookware with propping assembly of claim 5, further comprising a utensil support assembly pivotally coupled to said handle portion adjacent to said heating position, said utensil support assembly being for supporting a handle portion of a cooking utensil used in conjunction with said cookware.

7. The cookware with propping assembly of claim 6, wherein said utensil support assembly further comprises:
    a first upright member pivotally coupled to a first side of said handle portion;
    a second upright member pivotally coupled to a second side of said handle portion; and
    a cross member extending from a medial portion of said first upright member to a medial portion of said second upright member, said cross member supporting the handle portion of the cooking utensil when the cooking utensil is positioned along said handle portion.

8. The cookware with propping assembly of claim 7, further comprising a ring member pivotally coupled to said handle portion adjacent to said distal end of said handle, said ring member encircling a distal end of the handle of the cooking utensil positioned on said utensil support member to prevent unwanted slippage of the cooking utensil from said utensil support member.

9. A cookware with propping assembly for draining grease away from food while cooking, comprising:

a piece of cookware having a heating portion and a handle portion, said heating portion having a bottom wall adapted for resting upon a burner and for supporting food to be heated, said handle portion having a proximal end and a distal end, said proximal end of said handle portion being operationally coupled to said heating portion, said handle portion extending outwardly from said heating portion;

a propping assembly coupled to said handle portion adjacent to said distal end, said propping assembly having a length greater than a distance between a bottom of said handle portion and a support surface, said propping assembly having an extended position whereby said handle portion is supported above the support surface and said heating portion is tilted from a horizontal resting position;

a utensil support assembly pivotally coupled to said handle portion adjacent to said heating position, said utensil support assembly being for supporting a handle portion of a cooking utensil used in conjunction with said cookware.

10. The cookware with propping assembly of claim 9, wherein said utensil support assembly further comprises:

a first upright member pivotally coupled to a first side of said handle portion;

a second upright member pivotally coupled to a second side of said handle portion; and a cross member extending from a medial portion of said first upright member to a medial portion of said second upright member, said cross member supporting the handle portion of the cooking utensil when the cooking utensil is positioned along said handle portion.

11. The cookware with propping assembly of claim 10, further comprising a ring member pivotally coupled to said handle portion adjacent to said distal end of said handle portion, said ring member encircling a distal end of the handle of the cooking utensil positioned on said utensil support member to prevent unwanted slippage of the cooking utensil from said utensil support member.

* * * * *